United States Patent [19]

Gérard

[11] Patent Number: 4,827,338
[45] Date of Patent: May 2, 1989

[54] HYBRID CODING PROCESS BY TRANSFORMATION FOR THE TRANSMISSION OF PICTURE SIGNALS

[76] Inventor: Eude Gérard, 26 allée Jean Bart, F 77200 Torcy, France

[21] Appl. No.: 67,774

[22] PCT Filed: Oct. 20, 1986

[86] PCT No.: PCT/FR86/00362
§ 371 Date: Jun. 4, 1987
§ 102(e) Date: Jun. 4, 1987

[87] PCT Pub. No.: WO87/02854
PCT Pub. Date: May 7, 1987

[30] Foreign Application Priority Data
Oct. 22, 1985 [FR] France .................................. 8515649

[51] Int. Cl.⁴ ............................................. H04N 7/12
[52] U.S. Cl. ................................... 358/136; 358/135
[58] Field of Search ............................... 358/136, 135

[56] References Cited
U.S. PATENT DOCUMENTS

| | | |
|---|---|---|
| 4,281,344 | 7/1981 | Mounts et al. ........................ 358/136 |
| 4,394,774 | 7/1983 | Widergren et al. ............. 358/136 X |
| 4,541,012 | 9/1985 | Tescher .......................... 358/135 X |
| 4,546,386 | 8/1985 | Matsumoto et al. ................. 358/136 |
| 4,581,638 | 4/1986 | Chiariglione et al. .............. 358/135 |
| 4,704,628 | 11/1987 | Chen et al. ............................ 358/136 |

FOREIGN PATENT DOCUMENTS
2102652  2/1983  United Kingdom .

OTHER PUBLICATIONS
Transactions on Communications, vol. COM-25, No. 11, Nov. 1977, IEEE New York (U.S.) Ali Habibi: "Survey of Adaptive Image Coding Techniques", pp. 1275-1279, Line 6, p. 1281, Line 20-p. 1282, Line 7: Figure 4.

Primary Examiner—James J. Groody
Assistant Examiner—Victor R. Kostak
Attorney, Agent, or Firm—Oblon, Fisher, Spivak, McClelland & Maier

[57] ABSTRACT

Hybrid coding process by transformation for the transmission of images or pictures. The pictures are defined by a sequence of frames, each frame containing a set of matrix-organized blocks, each block containing a set of digital data organized in matrix form and representing part of the picture. The process successively comprises the stages of transforming each block in the frequency range, quantifying the transformed coefficients of each block, evaluating the data volume necessary for coding said transformed block by an intraframe mode statistical coding, evaluation of the data volume necessary for coding said transformed block by an interframe mode statistical coding, comparison of said data volumes and decision concerning the coding mode as a function of said date volumes and the maximum volume authorized by the flow rate on the transmission line and statistical coding of said block by a variable length code.

5 Claims, 6 Drawing Sheets

HYBRID CODING PROCESS BY TRANSFORMATION FOR THE TRANSMISSION OF PICTURE SIGNALS

The present invention relates to a hybrid coding process by transformation for the transmission of image or picture signals. The invention relates to the real time processing of sequential information signals, such as video signals, with a view to compressing the data volume necessary for representing said picture, so as to transmit it with a minimum bit rate on a transmission line. The inventive process more particularly applies in television, visioconference or visiophony. It can also be applied to pictures with slow variations, such as in remote monitoring.

Over the last few years, numerous processes have been proposed for compressing a picture signal in order to reduce the rate necessary for the digital transmission of said picture. This has been based on the wish to limit the digital rate, so as to be able to transmit video signals on a low rate line or transmit several of these simultaneously on one line.

In general terms, the video signal is firstly converted into a digital signal, which is then compressed in several stages. A first compression of the video signal is obtained by subsampling of the digitized luminance signal and digitized chrominance signals, e.g. for a 384 kbit/s visioconference application, whereby said first processing can make it possible to obtain a compression rate of approximately 10 to 15. The rate corresponding to a picture according to CCIR recommendation 601 is consequently brought from 166 to 11.7 mbits/s. The second compression stage is a stage involving the transformation of the picture in the frequency range, followed by interframe or intraframe coding of the coefficients of the transformed picture. The third stage is a statistical coding, generally of the HUFFMANN type, of the sequential signal constituted by the transformed and coded coefficients.

The inventive process relates to the second stage and aims at a greater compression of the picture signal, whilst maintaining an appropriate picture quality.

In general terms, in order to perform the second coding stage, the picture is subdivided into a plurality of identical blocks. Each of these blocks is separately coded, either by an interframe code, or by an intraframe code. Interframe coding consists of coding the difference between the coefficients of one block of a frame of a picture and the coefficients of the corresponding block of the frame of the previous picture. Intraframe coding consists of a direct coding of the block coefficients. In the interframe mode, the differences can relate to blocks in the spatial range, the blocks then representing part of the picture, or to blocks in the frequency range, the blocks being obtained by transforming picture blocks and representing the frequency components of said picture.

The transform can be a cosine transform, a FOURIER, a HADAMARD transform, a Haar transform or the like. The coefficients of the transformed block are called in general frequency coefficients, or sequential coefficients in the case of the HADAMARD transform. The coefficients of the transformed block do not exactly represent the frequency components of the picture corresponding to the untransformed block. However, by linguistic misuse, the transformed block range will be called the frequency range.

A picture compression system using interframe coding of the blocks is described in European patent application EP-A2-0084270. In this known system, the corresponding blocks of two successive frames are compared and then, if the difference between the two blocks exceeds a given threshold, the block is converted in the frequency range by a discrete cosine transform before being coded by statistical coding.

European patent application EP-A2-0123456 discloses a coding system using interframe and intraframe modes in a combined manner. This system uses variable prediction factors to take account of the fact that the correlation between the corresponding transformed coefficients between individual frames is generally variable and non-linear. This system eliminates the redundant data between the blocks of the same frame of the spatial or space range and between the corresponding blocks of consecutive frames in the frequency range.

In known coding systems and particularly in the systems described in the two aforementioned European patent applications, the choice of the interframe or intraframe coding mode for a block, or optionally the non-refreshing of the block (if the current block is identical to the corresponding block of the preceding frame) is determined by an a priori decision criterion. For example, in European patent application EP-A2-0084270, a block is compared with the corresponding block of the preceding frame and it is decided to carry out interframe coding if the difference exceeds a predetermined threshold. In the opposite case, a decision is made not to refresh the block. In European patent application EP-A2-0123456, the coding simultaneously uses the interframe and intraframe modes. This coding uses different a priori fixed sets of prediction factors as a function of the interframe differences of corresponding blocks. Thus, the coding decision is limited to the choice of one of the sets of prediction factors.

These decision criteria are not fully satisfactory because they limit the choice of the coding mode to one or several a priori fixed alternatives. Thus, they do not make it possible to take account in optimum manner of the structure of each block to be coded.

The invention moves away from these known solutions by proposing making an a posteriori decision, i.e. after having evaluated the data volume necessary for the transformation of a block according to the intraframe and interframe coding modes. Unlike in the prior art coding systems in which a decision is made a priori and on the basis of subjective criteria in connection with the coding mode for a block, the coding process according to the invention consists of effectively coding a block in accordance with each of the two, interframe and intraframe, coding modes and then deciding on the coding mode. For example, this decision can be based on a criterion of minimizing the instantaneous rate necessary for a given picture or image quality.

More specifically, the present invention relates to a process for hybrid coding by transformation for reducing the data volume necessary for representing pictures, in which the pictures are defined by a sequence of frames, each frame containing a set of matrix-organized blocks, each block containing a set of matrix-organized digital data representing part of the picture, characterized in that the process involves the transformation of each digital data block into a block of transformed coefficients representing said block in the frequency range, quantifying the transformed coefficients of each block to obtain quantified transformed coefficients, each having a value taken from a limited set of predetermined values, scanning each block of quantified transformed coefficients to produce a sequence of quantified transformed coefficients and evaluating the data volume necessary for coding said sequence by statistical coding, calculating a block of difference coefficients by a difference between a block of quantified transformed coefficients and the corresponding block of the preceding frame, scanning the block of difference coefficients for producing a sequence of difference coefficients and evaluating the data volume necessary for coding said sequence of difference coefficients by said statistical coding, comparison of the data volumes necessary for coding a block and deciding on the coding mode as a function of said data volumes and the maximum volume authorised by the rate on the transmission lines and statistical coding of the block, in accordance with the decided mode, by said statistical code.

In this process, there is a parallel evaluatio of the digital volume of the code corresponding to the statistical coding of the current block (intraframe coding) and the digital volume of the code corresponding to the statistical coding of the difference between the current block and the corresponding block of the preceding frame (interframe coding). These evaluations are made respectively by analysing the number and position of transitions in the sequence of quantified transformed coefficients and in the sequence of difference coefficients. These evaluations only require simple mathematical operations, generally additions and can therefore be very rapidly obtained. The effective statistical coding is then carried out, following the decision being taken concerning the coding mode.

Experience has shown that if, in general, two successive images or pictures are not identical, a large number of blocks may undergo no modification between successive frames. This is in particular the case with visiophonic pictures or pictures supplied by remote monitoring systems. It is pointless in this case to transmit the unmodified blocks of a picture, because they have already been transmitted with the preceding picture.

Advantageously, the process according to the invention involves a supplementary movement detection stage, performed after the transformation stage or after the quantification stage, said movement detection stage consisting of a comparison of a transformed block of a frame with the corresponding transformed block of the preceding frame and, in the case where the two blocks are identical or very close, emitting on the transmission line a non-refreshing code for the block.

It is considered that the two blocks are very close, e.g. if the sum of the squares of the difference of their coefficients is below a given threshold. This threshold can be fixed or dynamically determined as a function of the instantaneous rate on the transmission line.

This movement detection stage is defined by an a priori decision criterion. The process of the invention can also comprise an a posteriori decision criterion regarding the movement detection in the picture.

In a preferred manner, the a posteriori movement detection criterion is taken into account during the decision stage, said stage defining a non-refreshing of the processed block if the data volumes necessary for interframe and intraframe coding operations are below a predetermined threshold.

Thus, if the data volumes necessary for coding the processed block in accordance with the interframe mode and in accordance with the intraframe mode are below a predetermined volume, this means that the processed block differs only slightly from the corresponding block of the preceding frame. Then, on this side of a certain threshold constituting the predetermined threshold, it is considered that the small movement detected in the block does not justify the quantity of bits necessary for its refreshing.

It is clear that the a priori movement detection criterion and the a posteriori movement detection criterion are independent. Thus, the inventive process may take account of neither of these two criteria, may take account of only one of them, or take account of both simultaneously.

In summarizing, the essential feature of the inventive process is an a posteriori decision of the coding mode for one block from among the interframe coding mode, the intraframe coding mode and optionally the non-refreshing mode. The process can also advantageously be completed by an a priori movement detection criterion. The a posteriori decision concerning the coding mode, compared with the prior art process and system, permits a better optimization (minimization) of the instantaneous data rate necessary for transmitting a block with a given quality.

If, on the one hand, the possibility of choosing between several coding modes and, on the other, the criterion used for determining this choice are essential parameters of the compression rate which it is wished to obtain and, in this connection, have formed the object of a large number of publications, the scanning stage consisting of transforming a bidimensional block into a sequential string of data is not generally optimized.

It is known that the elements of a transformed block are the frequency components of the image or picture portion represented by the non-transformed block. In a transformed block of size $N \times N$, where the coefficients have values between 0 and N-1, the coefficient of coordinates (0,0) represents the continuous component and the other coefficients the alternating components, the low frequency components corresponding to the low value coefficients and the high frequency components to the high value coefficients. By experience, it is known that this transformed block has a large number of zero coefficients, particularly for the high frequency components. These zero coefficients provide no significant informations, in the sense that they do not contribute to the energy reconstruction of the picture following transmission. It is therefore pointless to code and transmit them.

In most of the solutions provided in the prior art, the transformed block is read by zigzag scanning, i.e. the bidimensional block is transformed into a sequence of coefficients in the order of the following values (0,0), (0,1), (1,0), (2,0), (1,1), (0,2), (0,3), (1,2),.. this sequence terminates by the last non-zero coefficient of the transformed block.

This single scanning suffers from the major disadvantage of not taking account of the structure of the block, i.e. the location of the most significant coefficients. Thus, for example, when the transformed block comprises non-zero coefficients essentially on one line, the zigzag scanning produces a sequence having a large number of zero coefficients.

One objective of the inventive process is to improve said scanning stage so as to produce a sequence of coefficients representing the transformed block and having a minimum number of zero values. To achieve this objective, several classes of blocks are defined, each corresponding to a given frequency structure and a scan adapted to said class is associated with each class. Each class is defined as a single zone or a combination of several zones of a set of zones constituting a partition of the block.

BRIEF DESCRIPTION OF THE DRAWINGS

The characteristics and advantages of the invention can be better gathered from the following illustrative and non-limitative description with reference to the attached drawings, wherein show.

In order to illustrate the inventive process, choice is made in an exemplified manner of the case of coding a visiophone or picture phone-type signal, which it is wished to transmit on a low rate 64 kbit/s line. It is obvious that this example is of a purely illustrative nature and in no way limits the invention.

DESCRIPTION OF THE PREFERRED EMBODIMENTS

Figure 1:
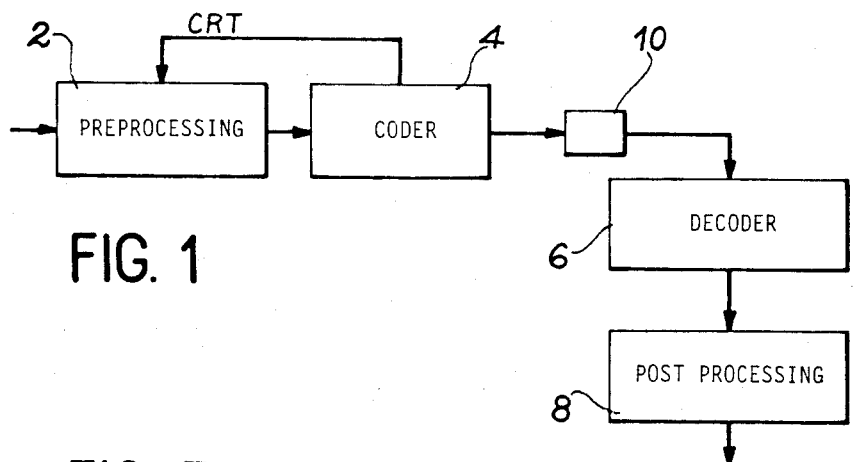
FIG. 1, a block diagram of a transmission system incorporating a coding system according to the invention.

FIG. 1 shows a picture or image signal transmission system incorporating a coding system according to the invention. This system comprises, for the emission or transmission part, a preprocessing device 2 and a coding system 4 and, for the reception part, a decoding system 6 and a post processing means 8. The connection between coding system 4 and decoding system 6 is provided by a transmission line 10. The preprocessing means 2 receives an analog video signal, which is e.g. in the form of an analog luminance component Y and an analog chrominance component constituted by two signals dB, dR of multiplexed colour differences. The preprocessing means can also directly receive the signals R, V and B supplied by the camera. The received signals are processed in conventional manner, so as to make their characteristics compatible with the compression capacities of the coding system 4. This processing will be described in greater detail relative to FIG. 2 and in particular comprises a digitization of the analog components and a subsampling of said signals.

The coding system 4 is the essential component of the transmission system of FIG. 1. It realises the inventive process for subdividing each image or picture into several blocks and for deciding, in accordance with an a posteriori decision criterion, on the interframe or intraframe coding mode. The coding system can also include picture movement detection means in corresponding blocks of two successive frames and use an a priori decision criterion and/or an a posteriori decision criterion for transmitting on the transmission line 10 a non-refreshing code for the processed block.

When the coding mode of a block is decided, by the a posteriori decision criterion of the inventive process, in conventional manner this block is coded by a variable length code, called a statistical code, such as a HUFFMANN code. The thus produced codes are combined with service codes in the frames, which are transmitted on transmission line 10.

On reception, the decoding system 6 performs an operation which is the reverse of that performed by coding system 4 on the frame received. Itsupplies the post processing device 8 with digital luminance and chrominance signals which, in the best of cases, are identical to the signals supplied by preprocessing device 2 to coding system 4. The post processing device 8 operates on the data received from the decoding system 6 with respect to processing operations such as oversampling and analog—digital conversion in order to restore the initial video signal.

Figure 2:
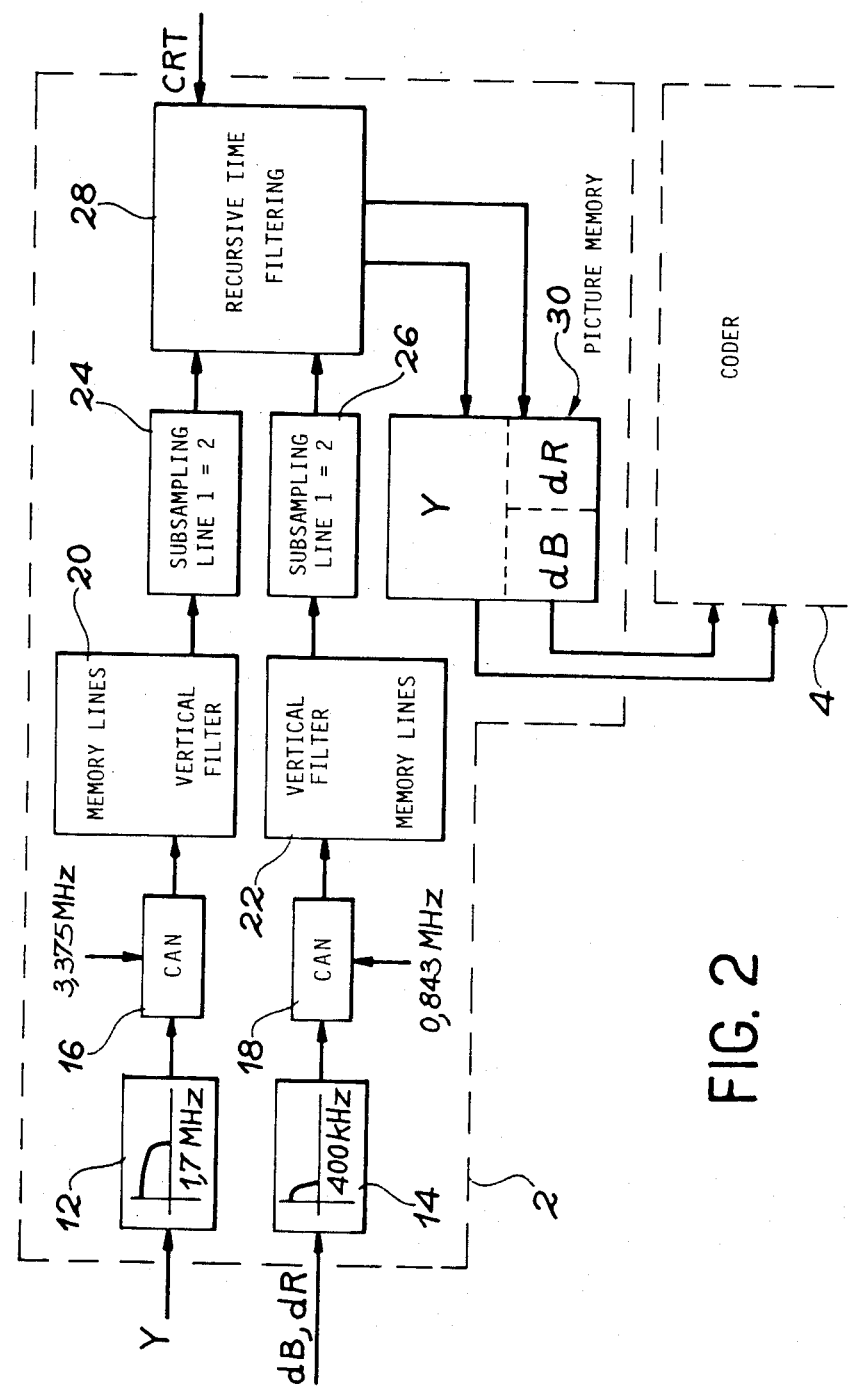
FIG. 2, a diagrammatic drawing of a preprocessing device receiving a video signal constituted by an analog luminance signal Y and two analog chrominance signals dB, dR, said device effecting a compression of said signals and supplying a bidimensional digital luminance signal and two bidimensional digital chrominance signals.

FIG. 2 is a diagrammatic drawing of preprocessing device 2 of FIG. 1 for the chosen application of transmission of a visiophony signal on a 64 kbit/s line. This device does not form part of the invention and its structure is well known in the art.

At the input, preprocessing device 2 has a low-pass filter 12 and a low-pass filter 14 for respectively receiving the analog luminance signal Y and the multiplexed analog signal of colour differences incorporating the chrominance components dB and dR. These low-pass filters have a respective cut-off frequency of 1.7 MHz and 400 KHz at 3 dB. Each of the signals supplied by these filters are received in an analog - digital converter 16, 18. The luminance signal supplied by low-pass filter 12 is sampled at a frequency of 3.375 MHz and linearly quantified on 8 bits by analog—digital converter 16. In the same way, the chrominance signal supplied by low-pass filter 14 is sampled at frequency 0.843 MHz and linearly quantified on 8 bits by analog—digital converter 18.

Each of the signals supplied by the analog digital converters is then processed by a vertical digital filter 20, 22 in order to reduce the vertical pass band. This filtering operation requires line memories, which are included in the filters. Filtering is performed on three consecutive lines with the following coefficients: ¼, ½ and ¼.

Figure 3:
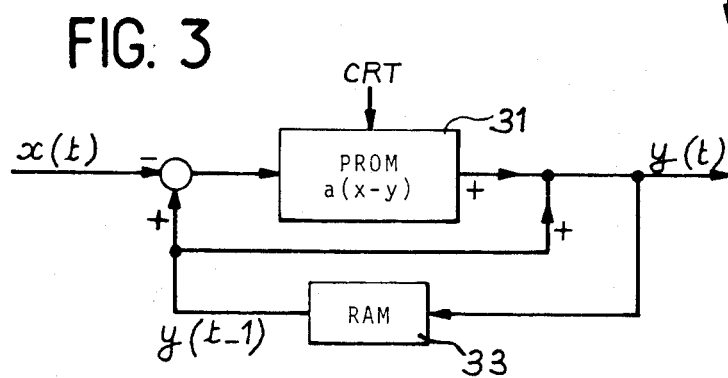
FIG. 3, an embodiment of the recursive time filtering means of the preprocessing device.

The signal supplied by filters 20 and 22 are subsampled in a ratio of 2 respectively by means 24 and 26. The subsampled luminance and chrominance signals are then applied to inputs of a recursive time filter 28. The latter performs time subsampling, so as to adapt the image frequency to the characteristics of the coder. This filter also makes it possible to reduce the time noise of the source, which is very important when the illumination conditions are not of an optimum nature or when the cameras are not of good quality. This filter also ensures a regulation of the entropy, so as not to transmit useless information to the coder. This regulation is controlled by a CRT signal from the coder, which is a function of the instantaneous bit rate on the transmission line. A possible equation for the recursive time filter is:

y(k,l,t)=a.x(k,l,t)+(1−a).y(k,l,t−1)

in which x(k,l,t) is the image point of coordinates (k,l) of the frame t, y(k,l,t−1) is the filtered image point of coordinates (k,l) of frame t-1 and a is a coefficient dependent on the difference (x(k,l,t)−y(k,l,t−1)). An embodiment of this filter is diagrammatically shown in FIG. 3 and essentially comprises a read-only memory 31, e.g. of the PROM type, containing in the value cell x(t)−y(t−1) the data a.(x−y). This filter also has an image or picture memory 33 for storing the filtered frame preceding the current frame. Following the filtering of the luminance and chrominance signals by the recursive time filter 28, the picture signal has the following characteristics:

| Number dots/line | 180(Y) | 45(dB) | 45(dR) |
|---|---|---|---|
| Number of lines/frame | 144(Y) | 38(dB) | 38(dR) |
| Number of frames/s | 6.25(Y) | 6.38(dB) | 6.25(dR) |
| Number of bits/dot | 8(Y) | 8(dB) | 8(dR) |
| Bit rate | | 1.467 Mbit/s | |

This picture is stored in a picture memory 30 constituting an output buffer store of the preprocessing device.

Figure 4:
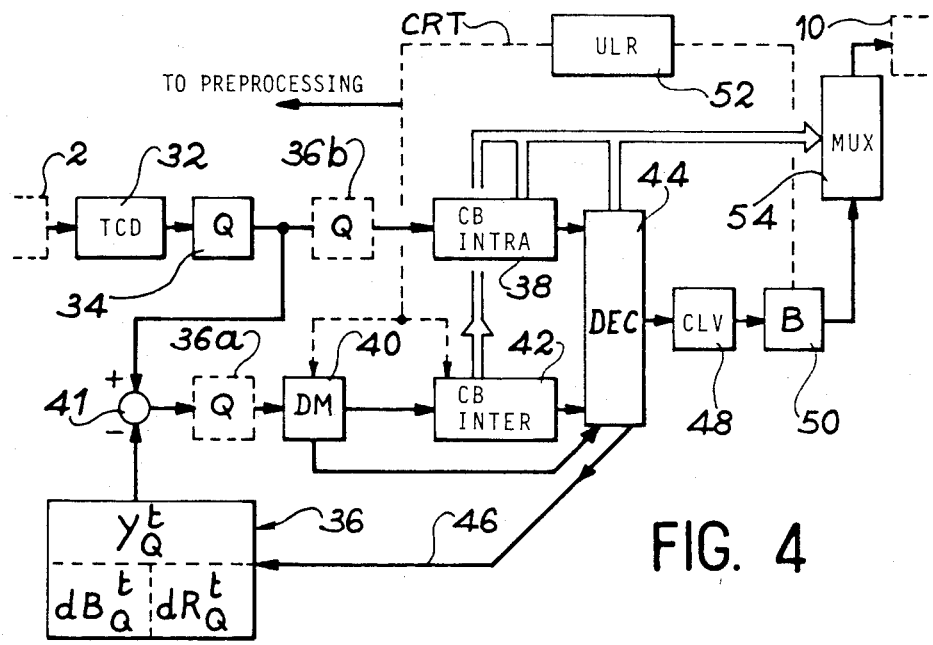
FIG. 4, a diagrammatic representation of a coding system according to the invention.

FIG. 4 diagrammatically shows a hybrid coding system for performing the coding process according to the invention. This coding system receives the pictures supplied by the preprocessing device. Each picture is in the form of three data matrixes, namely a luminance data matrix Y, a colour difference data matrix dB and a colour difference data matrix dR. The coder is able to process these three sets in an independent or non-independent manner. The set of luminance data and the sets of chrominance data are processed either in parallel, or sequentially, as a function of the architecture of the coding system. In a conventional manner, the sets of luminance and chrominance data representing a picture are subdivided into blocks. For the luminance, these blocks e.g. have a size of 16×16 and for the chrominance a size of 8×8. In general terms, the size of the blocks results from a compromise between the desired compression factor and the design constraints of the coding system.

The input element of of the coding system is a transformation means 32 for transforming each received block into a block of transformed coefficients. This transformed block represents the frequency structure of the picture portion corresponding to the block. For example, the transformation of a picture realized by transformation means 32 is an even cosine discrete transformation, which is known to the Expert and defined in the following way:

$$x(u,v) = \sum \sum_{\substack{0 \leq k \leq N-1 \\ 0 \leq l \leq N-1}} x(k,l) \cdot A(k,u) \cdot A(l,v)$$

-continued $$\text{with } A(k,u) = \sqrt{\frac{2}{N}} \cdot C(u) \cdot \cos(nu(2k+1)/2N)$$

and $C(u) = \frac{1}{2}$ if $u = 0$ and $C(u) = 1$ if $u \neq 0$.

In this expression, x(k,l) represents the coefficient of coordinates (k,l) in a non-transformed block and x(u,v), the coefficient of coordinates (u,v) in the transformed block, N×N being the size of the block.

In preferred manner, the transformation means 32 is in accordance with the fast calculating circuit of the cosine transform described in French patent application 85 07717 filed on 22.5.1985. This circuit has the advantage of having, for a block of size N=16, one less calculating stage compared with known cosine transform calculating circuits. Transformation can be separated for two-stage calculations, i.e. a stage of calculating the discrete cosine transform on the rows of the block and a stage of calculating the discrete cosine transform on the columns of the block. With a rate of the signal source of 1.467 mbit/s in the chosen example, these transformations can be calculated with the aid of two signal processing processors, e.g. of the TEXAS INSTRUMENTS type TMS 320 10.

These discrete cosine transform has three fundamental properties:
energy retention (PARSEVAL theorem),
the high amplitude points are statistically concentrated on the low frequency coefficients, i.e. on the coefficients of the transformed block having low values (u and v),
the probability of having significant amplitudes on the high frequency coefficients (high u and v) is very small.

These properties are essential for coding coefficients of the transform. Thus, in most transformed blocks, few coefficients are in fact useful for the reconstruction of the picture and consequently only a few points will be transmitted. The main difficulty is in the means for addressing the few high frequency coefficients significant in the transformed range, because the rate to be reached on the transmission line does not make it possible to use numerous addressing bits.

Following the transformation of the blocks by means 32, part of the compression is reached by the quantification of the transformed blocks. This is carried out by a quantifier 34, preferably immediately following the transformation. It is then outside the interframe coding loop. However, quantification can also be carried out by a quantifier 36a located in the interframe coding loop.

This quantifier then then receives at the input the difference between the current block and the corresponding block of the preceding frame. For intraframe coding, quantification is performed by a quantifier 36b functioning in a similar manner to quantifier 34 with thresholds which can differ. Quantifiers 36a and 36b can be adaptive and serve as means for regulating the rate on the transmission line.

The continuous component, i.e. the transformed coefficient of cordinate u=0 and v=0 is quantified with a uniform step. The alternating components are quantified with a non-uniform step. For example, seven different quantifiers can be used for the luminance data and five for the chrominance data. The attached table I gives an example of the allocation of quantifiers. The zero values of this table represent the untransmitted transformed coefficients, which are solely high frequency components, whereof it is known, through the properties of the discrete cosine transform, that the probability that they have a non-negligible amplitude is low.

In the case where the quantifier is outside the coding loop, the quantification levels can e.g. be determined by an algorithm of minimizing the standard error or pragmatically and subjectively by successive tests. These quantification levels $X_Q$ can be defined in the following way.

If $QD(n) < X(u,v) < QD(n)$ then $X_Q(u,v) = (QD)n-1)/2$ with $QD(n) = T + nG + f(n)A$ and $f(n) = (n-2)(n-1)/2$ $(n>)$ in which QD(n) (n integer) are decision thresholds, T is a threshold on this side of which the coefficient X(u,v) is not significant n.G+f(n).A defines the quantification step.

The quantified coefficients of the transformed luminance and chrominance blocks of the same frame are stored in a transformed frame memory 36. The latter is used in the interframe coding mode for calculating the difference between a transformed block of the current frame and the corresponding transformed block of the preceding frame, which is stored in memory 36. Instead of storing the quantification levels in said memory, it is possible to simply store the values of these levels, which makes it possible to reduce the size required for storing a transformed frame.

The stages of transforming blocks in the frequency range and the quantification of these transformed blocks are conventional stages of picture coding processes. The originality of the process for coding according to the invention is based on the decision criterion used for coding each transformed block before applying the same to the transmission line. It is pointed out that this decision criterion is an a posteriori criterion based on the data volume to be transmitted per energy unit, i.e. the ratio between the number of bits of the transmitted code with respect to the information quantity contained in the transformed block.

This stage of the coding process is realized in the coding system of FIG. 4 by the following elements: an intraframe processing means 38, whose input is connected to the output of the quantification means 34 (or 36b), a movement detection means 40, whose input receives from a subtracter 41 the difference between a block supplied by the quantification means 34 and the quantified coefficients of the corresponding block of the preceding frame stored in memory 36 (when the quantification is effected in the coding loop, quantifier 36a is inserted between subtracter 41 and movement detection means 40 and the positive input of subtracter 41 is connected to the output of means 32), an interframe processing means 42, whose input is connected to the output of the movement detection means 40, a decision unit 44 deciding on the coding mode for each block as a function of the signal supplied by the processing means 38, 42 and by the movement detection means 40.

The decision unit 44 also controls the addressing of memory 36 by channel 46. Thus, when detection means 40 indicates that the current transformed block is identical to the corresponding block of the preceding frame, there is no need to again refresh said current transformed block because it is already contained in memory 36.

Decision unit 44 is provided with reconstruction means which, in the interframe mode, add the blocks supplied by means 42 to the corresponding block contained in memories 36. Decision unit 44 is followed by a statistical coder 48 realizing in conventional manner a variable length code (CLV) for coding the transformed block (case of intraframe coding) or the difference between the current transformed block and the block corresponding to the preceding frame (case of interframe coding). The code supplied by coder 48 is passed into a buffer store 50, whose filling is controlled by a logic regulating unit 52. As a function of the state of buffer 50, this unit controls the parameters of the movement detection means 40 and processing means 38, 42, in such a way that buffer 50 is never completely empty or completely full. The codes contained in buffer 50 are then multiplexed with the service codes emitted by the processing means 38, 42 and by the decision unit 44. Ths multiplexing is carried out by a multiplexer 54, whose output constitutes the input of the transmission line.

The movement detection means 40 is of a conventional nature. It consists of analysing the block resulting from the difference between the current transformed block supplied by the quantification means 34 and the corresponding block of the preceding frame supplied by memory 36. The block is declared to be fixed and the memory is not modified if:

$$|D(0,0)|^2 < TD \text{ and } \left( \sum_{\substack{u,v \\ (u,v) \neq (0,0)}} |d(u,v)|^2 \right) < TA$$

where TD and TA are thresholds fixed by the logic regulating unit 52 as a function of the filling state of buffer 50, D(u,v) is the difference between the coefficients X(u,v) of the current block and the corresponding block of the preceding frame.

In this case, there is no need to transmit the current transformed block, because it has already been emitted on the transmission line. It is merely necessary to transmit on the latter a service code indicating that the block is not modified. This code is transmitted by decision unit 44 to multiplexer 54.

When the block is not fixed, it is necessary to establish which is the best coding mode, i.e. the interframe mode or the intraframe mode. For this purpose, according to the invention, the transformed block is analyzed by the processing means 38 to evaluate the number of bits necessary for the coding of said block in the intraframe mode and it is analyzed in parallel by processing means 42 to evaluate the number of bits necessary for coding in the interframe mode. Processing means 38 and 42 function in a similar manner, the only difference being that processing means 38 processes a transformed block and processing means 42 a block resulting from the difference between two transformed blocks.

In known manner, each processing means has two calculating stages, namely a first scanning stage for passing the bidmentional structure of the block to a linear structure constituted by a sequence of coefficients and a calculating stage for evaluating the length of the code or number of bits produced by the statistical coder 48 for coding said sequence.

The scanning of the transformed block can be performed, as in known coding systems, by so-called zigzag scanning. If $X(u,v)$ is used for designating the coefficient of coordinates u,v in the transformed block, the zigzag scanning of the transformed block produces the sequence $X(0,0)$, $X(0,1)$, $X(1,0)$, $X(2,0)$, $X(1,1)$, $X(0,2)$, $X(0,3)$, $X(1,2)$,...

This coding can be used in the process according to the invention, but is not completely satisfactory, because it does not take account of the structure of the block, i.e. the location of the most important coefficients. Thus, for a block mainly having non-zero coefficients on the first line, zigzag scanning produces a sequence comprising a large number of zero coefficients. This is of no interest, because these zero coefficients, which supply no information for the reconstruction of the picture, will be taken into account by the statistical coder and will needlessly increase the volume of the code produced by the latter.

To obviate this disadvantage, it is proposed to use several scans, each adapted to the chaacteristics of the blocks. For this purpose, there is an a priori definition of a group of classes for representing different possible structures of a block and a particular scan is associated with each class. The classes are defined as a combination of zones, said zones constituting a partition of the block into several zones, which is carried out subjectively. The attached table II gives an example of such a partition, zones Zi in which $1 \leq i \leq 8$, being formed from a set of elements designated i in the table.

There are e.g. ten classes and on the basis of the zones can be defined in the following way:

```
C1  = Z1
C2  = Z1 U Z2
C3  = Z1 U Z2  U  Z3
C4  = Z1 U Z2  U  Z4
C5  = Z1 U Z2  U  Z3 U Z4
C6  = Z1 U Z2* U  Z3 U Z5
C7  = Z1 U Z2  U  Z4 U Z6
C8  = Z1 U Z2  U  Z3 U Z4 U Z5 U Z6
C9  = Z1 U .   .  . . . . . . U Z7
C10 = Z1 U .   .  . . . . . .  . U Z8
```

Figure 5A:
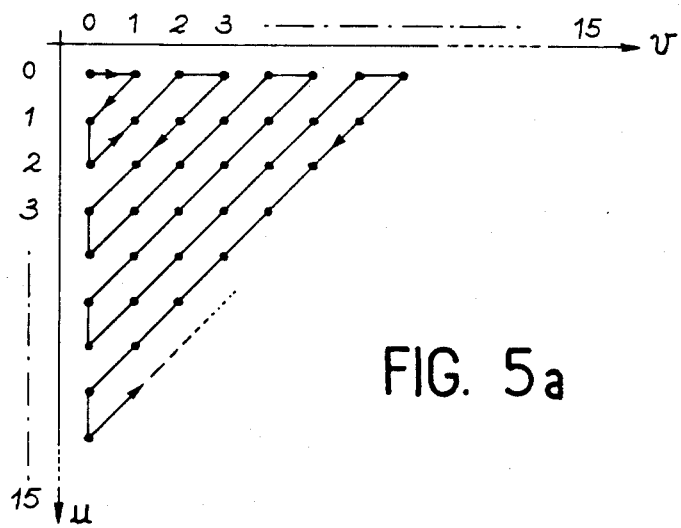
FIGS. 5a and 5b, scanning operations relative to a transformed block.
Figure 5B:
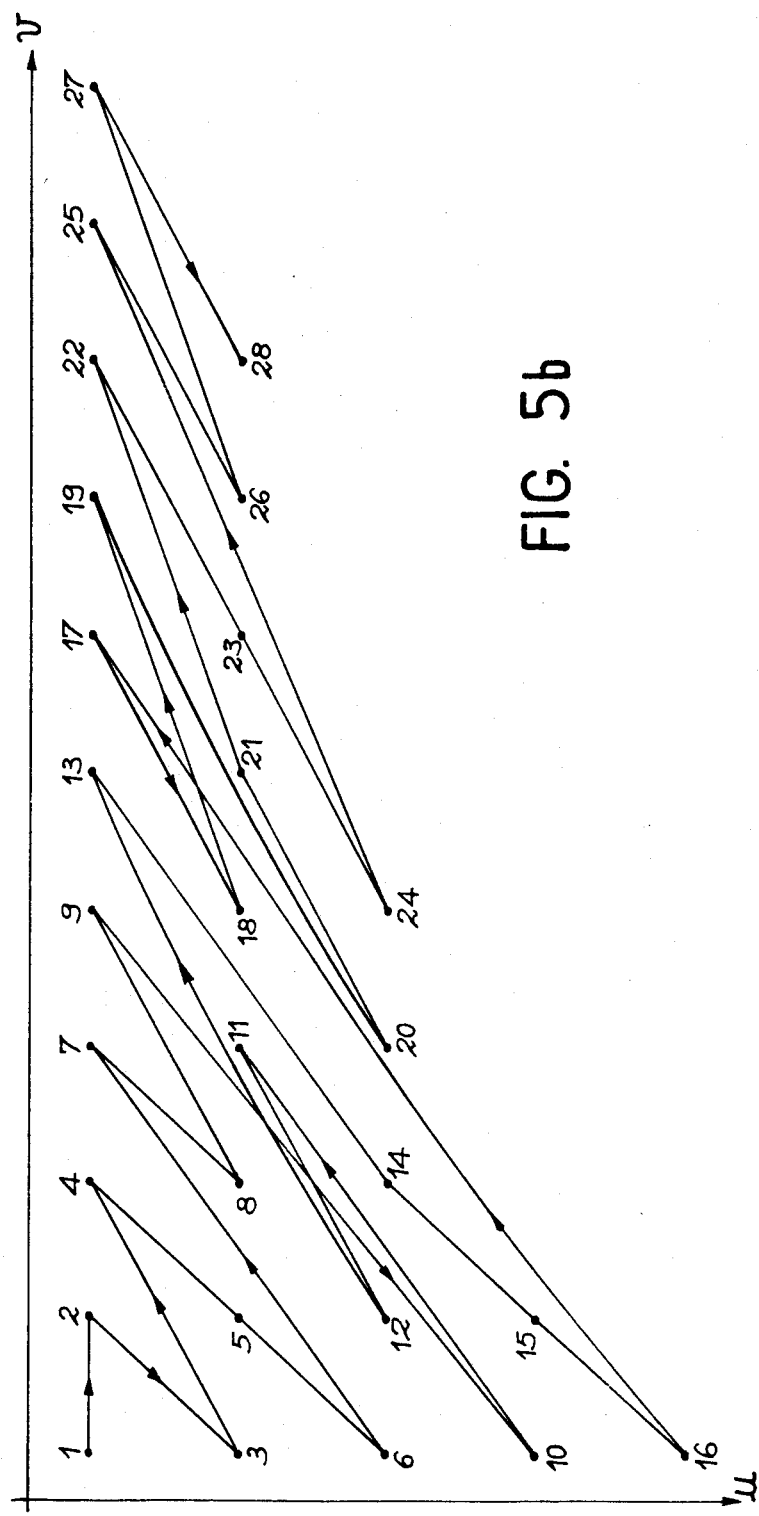

As examples, FIGS. 5a and 5b respectively show scans adapted to classes C3 and C10. Class C3 is the class of blocks, whereof the coefficients taken into account are those corresponding to values 1, 2 and 3 in table II (value i designating zone Zi and class C3 regroups zones Z1, Z2 and Z3). The scanning of a block of class C3 is indicated in FIG. 5a by a sequence of increasing numbers. The sequence produced by the scan is consequently: $Z(0,0)$, $X(0,1)$, $X(1,0)$, $Z(0,2)$, $X(1,1)$, $X(2,0)$, $X(0,3)$, $X(1,2)$, $X(0,4)$, $X(3,0)$,...

Class C10 is the class of blocks, whereof all the coefficients are taken into account (with the obvious exception of the coefficients at zero in the quantification stage and which correspond to value zero in tables I and II). Zigzag scanning conventionally used for all the blocks in the prior art, is suitable for this class. The scan is indicated in FIG. 5b by a sequence of rising numbers. The sequence produced is:

$X(0,0)$, $X(0,1)$, $X(1,0)$, $X(2,0)$, $X(1,1)$, $X(0,2)$, $X(0,3)$, $X(1,2)$,...

For determining the membership class of a block, it is possible to use an algorithm based on a pseudo-energy criterion. The pseudo-energy of block $PE_b$ is defined as the sum of the squares of the quantified transformed coefficients of the block, outside the continuous component, i.e.:

$$PE_b = \sum_{\substack{u \ v \\ (u,v) \neq (0,0)}} |X(u,v)|^2$$

In the same way, the pseudo-energy of the block in class j, where $i<j<10$, is defined by:

$$PE(j) = \sum_{\substack{u,v \\ (u,v) \neq (0,0)}} |X(u,v)|^2$$

The criterion of the block belonging to a class is that the ratio of the pseudo-energy in the class to the total pseudo-energy of the block exceeds a threshold $E_S$, i.e.

$$: PE(j) > PE_b \cdot E_S$$

Figure 6:
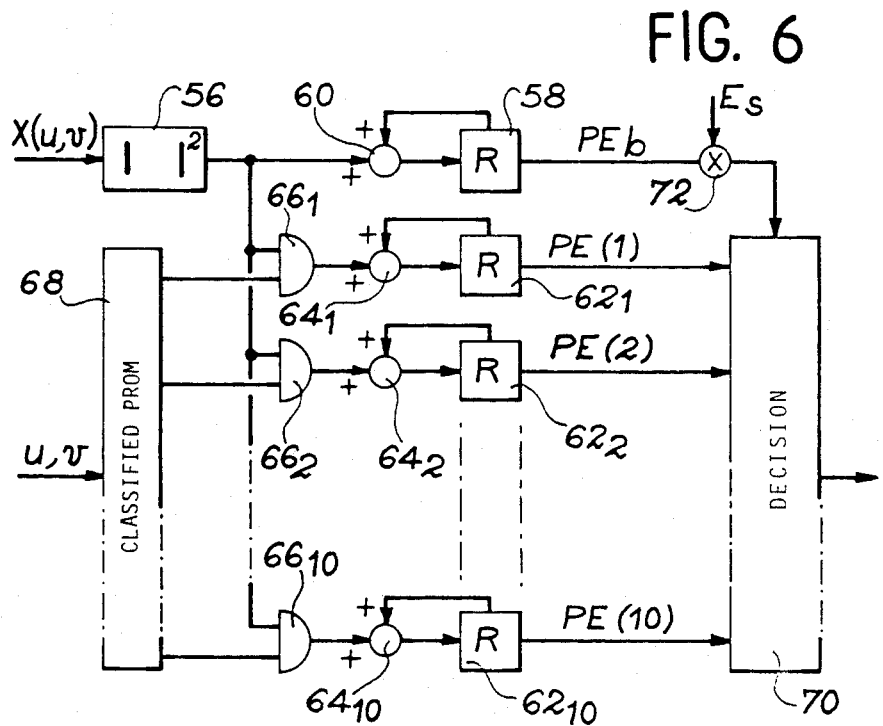
FIG. 6, in the case where the process includes several block classes, a device for determining the membership class of a block.

FIG. 6 diagrammatically shows a circuit for the determinination of the membership class of a block.

This circuit comprises a means 56, which successively receives each transformed coefficient of the block, with the exception of the continuous component $X(u,v)$. This means 56 calculates the square of each received coefficient and supplies said value to a register 58. An adder 60 associated with said register makes it possible to store in the register the sum of the terms supplied by means 56. At the end of each block, register 58 consequently contains the pseudo-energy of block $PE_b$.

The circuit also comprises registers $62_1 \ldots 62_{10}$, with each of which is associated an adder $64_1 \ldots 64_{10}$. Each register adder assembly is associated with a class and the storage of the square of the transformed coefficients supplied by means 56 is conditioned, for each register by an AND gate $66_1 \ldots 66_{10}$, whose validation is controlled by a read-only memory 68 addressed by a signal representing coordinates u and v of the coefficient processed by means 56. Thus, each register $62_1 \ldots 62_{10}$ only receives the squares of coefficients, whose coordinates u, v coincide with the class associated with said register. At the end of each block, we respectively obtain at the output of each of the registers $62_1 \ldots 62_{10}$, the pseudo energy $PE(1) \ldots PE(10)$ of the block in each of the classes.

These class pseudo-energies are applied to the inputs of a decision unit 70, which also receives the product of the pseudo-energy of block $PE_b$ supplied by register 58 and multiplied by the threshold energy $E_S$. This product is produced by a multiplier 72.

Figure 7:
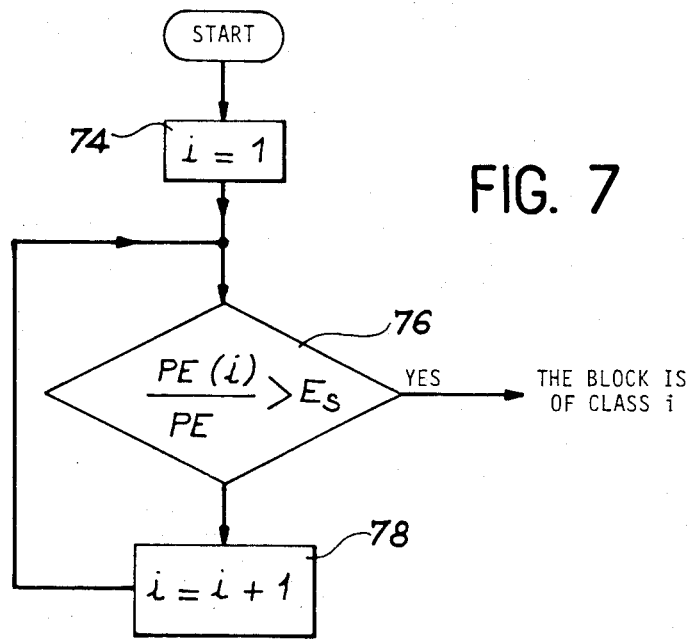
FIG. 7, a flowchart of the algorithm of the decision means of the device of the preceding drawing.

The determin ation of the membership class of the block is effected by the decision unit 70 in accordance with an algorithm, whereof a flowchart is shown in FIG. 7. This algorithm consists of successively comparing the pseudo-energy of each class with the total pseudo-energy of the block multiplied by the threshold energy. This algorithm comprises an initialization stage 74 for initializing the value of the loop index i at value 1. The following stage is a test 76 for the comparison of the pseudo-energy PE(i) with the product of the block pseudo-energy $PE_b$ multiplied by the threshold energy $E_S$. If the class pseudo-energy exceeds said product, it is decided that the block belongs to class i and the algorithm is finished. In the opposite case, we pass to a stage 78 of incrementing index i and test 76 is again applied with this new class index.

When the membership class of the block has been determined, the block is scanned in accordance with the scan associated with said class. The sequence of coefficients obtained by this scan is then analysed for determining its length and the length of the code produced by the statistical coder for coding said sequence. This analysis constitutes the calculation stage of the processing means.

Another possible method for determining the class of a block consists of scanning said block in accordance with a scanning group and then determining the optimum a posteriori. In this method, the following procedure is adopted for each class. The block is scanned in accordance with the scan associated with said class in order to produce a sequence of coefficients and the length of the sequence is determined so that it contains a given percentage, e.g. 95% of the energy of the block. This is followed by the comparison of the sequences obtained according to each scan and the shortest sequence is chosen. This is the sequence containing the least zero coefficients.

In this method, it is important to choose a group of scans differing widely in order that it possible, no matter what the scanned block, to find a short sequence containing most of the energy of the block.

For example, two very different scans are shown in tables III and IV. Each table is a matrix of 16×16 (size of a block) containing all the numbers from 1 to 256. The scan is carried out in the order of the rising numbers of the table.

Table III corresponds to a substantially horizontal scan and there is a short sequence of coefficients when the portion of picture represented by the block essentially contains horizontal frequencies. Table IV corresponds to a substantially diagonal scan and produces a short sequence of coefficients when the picture portion represented by the block is balanced in horizontal and vertical frequencies.

Figure 8:
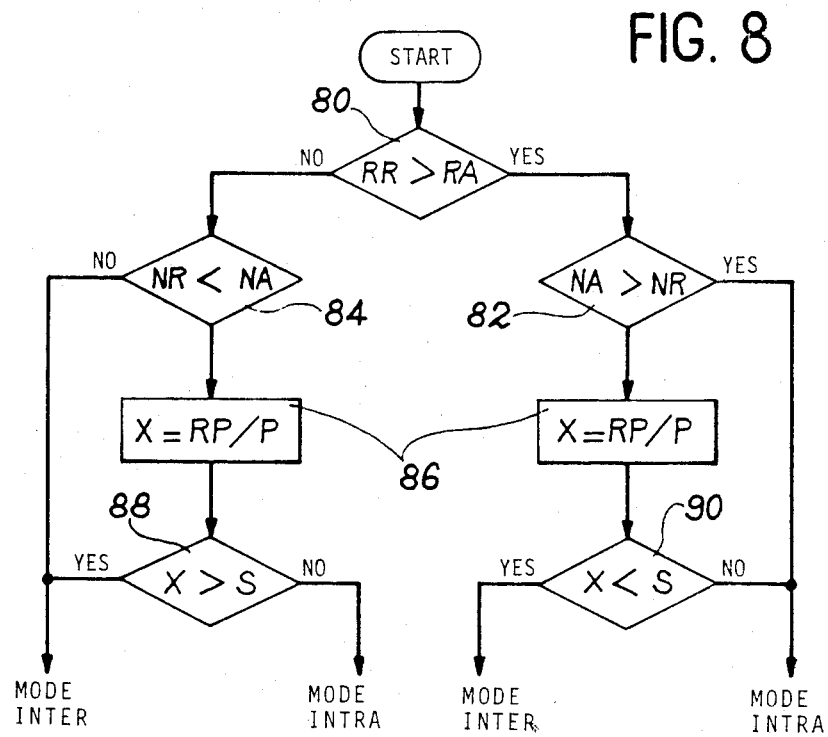
FIG. 8, a flowchart of the algorithm of the choice between the interframe and intraframe coding modes, said choice being carried out, according to the inventive process, a posteriori by comparing the data volumes obtained by statistical coding of the interframe mode-transformed block and the intraframe mode-transformed block.

The scanning stages with a search for the membership class of the block and the calculating stage are performed in parallel by processing means 38 on the transformed block and by the processing means 42 on the difference between the transformed block and the corresponding block of the preceding frame. Decision unit 44 (FIG. 4) decides on the optimum coding mode as a function of the result of the calculation stages of the two processing means. A flow chart representing the algorithm of the decision unit is shown in FIG. 8. the variables indicated in this flow chart represent the following:

NA: number of bits of the sequence in the intraframe mode,
NR: number of bits of the sequence in the interframe mode,
RA: number of bits of the statistical code of the sequence in the intraframe mode,
RR: number of bits of the statistical code of the sequence in the interframe mode,
RP=RA−RR,
P=NA−NR.

The flowchart comprises:
a comparison test 80 between RR and Ra,
a comparison test 82 between NR and NA, said test being performed if RR≦Ra,
a comparison test 84 between NA and NR, said test being performed if RR<RA,
a calculating stage 86 for calculating a variable X equal to Rr/p, said stage being performed if NR>NA in tests 82 and 84,
a test 88 for comparing X with a threshold S, said test being performed after stages 84 and 86,
a test 90 for comparing X with threshold S, said test being performed after stages 82 and 86.

The result of the algorithm is coding in the interframe mode if NR>NA in test 84, if X>s in test 88, or if X>S in test 90. In other cases the block is coded in the intraframe mode. This coding mode is effective if the variable NA and RA or NR and RR, as a function o the coding adopted, are respectively below two variables Nmax and Rmax supplied by the logic regulating unit 52 and whose values are dynamically fixed as a function of the filling level of buffer 50.

When the coding mode has been determined by decision unit 44 (FIG. 4), the sequence corresponding to said mode is transmitted to the statistical coder 48. The coefficients of this sequence are coded with a group of code words having a variable length calculated on the basis of the statistics of the amplitudes of the coefficients for each of the modes. It should be noted that the zero amplitude points, which are not significant for the reconstruction of the image, are however represented by a code word. Coder 48 uses a conventional statistical code, whichcan e.g. be a HUFFMANN code with a limted maxmmum length.

This coder produces a variable bit rate which must be regulated in order to be able to transmit on a transmission line at a constant rate, e.g. approximately 64 kbits/s. Buffer memory 50 used for carrying out this regulation also makes it possible to observe the periods where the picture varies greatly from one frame to the next. The regulation is necessary for preventing the content of buffer 50 from differing excessively compared with a mean filling level. Thus, it is necessary to reduce the rate when said buffer is full and permit a better quality coding if it is empty. This buffer has a size of approximately 20 kbits for the application chosen in exemplified manner.

Regulation is ensured by the logic regulating unit 52, which supplies the following regulation parameters:
parameter CRT applied to the recursive time filter of the preprocessing means,
threshold energy parameter $E_S$ for the determination of the membership class of the processed block,
parameter Nmax of the maximum number of coefficients of the sequence resulting from block scanning,
parameter Rmax of the maximum number of bits allocated to block coding,
fixed block decision threshold parameters TA and TD.

The attached table V gives an example of the values of these parameters as a function of the filling level of buffer 50.

The codes supplied by buffer 50 are multiplexed in a multiplexer 54 (FIG. 4) with the service codes emitted by the decision unit 44 and processing means 38, 42. These service codes are not received in buffer 50. However, they are taken into account for regulating the filling of the buffer, because they contribute to the rate on the transmission line. The attached table VI illustrates the structure of the frame transmitted by multiplexer 54 on the transmission line. Apart from the transmission and control synchronization informations (not shown in the table), said frame has a number of service codes followed by statstical codes. These service codes indicate the coding mode of the block, the membership class of the block in the case where several classes are defined and a number representing the final coefficient of the sequence resulting from scanning of the block.

The coding mode is represented on 2 bits for indicating either an a priori fixed block, or an a posteriori fixed block, or an intraframe mode coding, or an interframe mode coding. The number of bits used for designating the class is dependent on the number of classes defined. Number Nsup indicates the number of coefficients transmitted from the sequence resulting from the scan associated with the class. This number can be variable as a function of the class. It has a length e.g. between 4 and 7 bits.

The statistical code comprises a first field for coding the continuous component of the block and a second field for coding the alternating components. The code of the continuous component e.g. has a length of 5 bits in the interframe mode and 9 bits in the intraframe mode.

Figure 9:
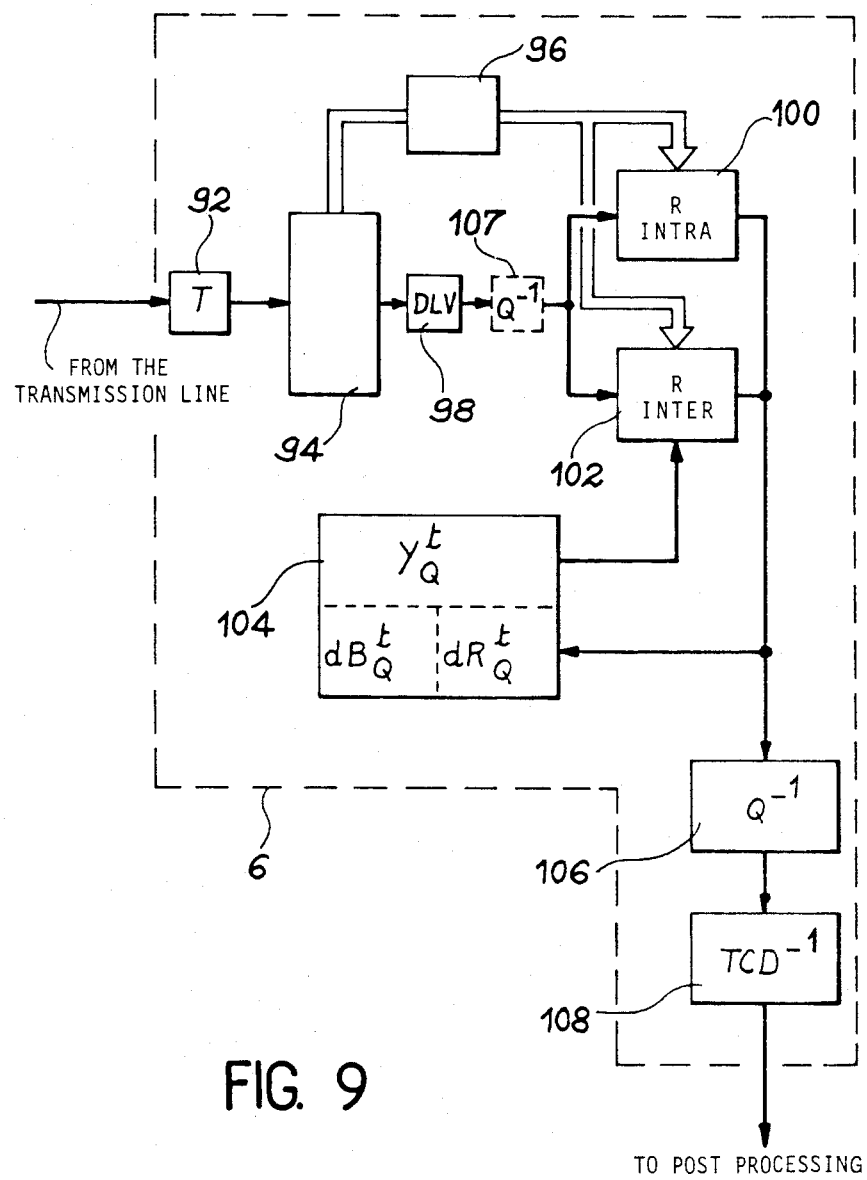
FIG. 9, a block diagram of a decoding system corresponding to the coding system of FIG. 4.

On reception, the frame is received in a decoder incorporating means for carrying out operations which are the reverse of those performed in the coder. A diagrammatic drawing of such a coder is provided in FIG. 9.

At the input, this coder comprises a buffer 92, which supplies a demultiplexer 94. The latter supplies on the one hand the service codes to a switching unit 96 and on the other the statistical codes to a decoder 98. The output of statistical decoder 98 is simultaneously connected to the input of an intraframe mode reconstruction means 100 and to the input of an interframe mode reconstruction means 102. These reconstruction means 100, 102 are controlled by the switching unit 96 as a function of the coding mode of the processed block.

The intraframe mode reconstruction means reconstructs the block of coefficients transformed on the basis of the sequence of coefficients supplied by the statistical decoder 98. The interframe mode reconstruction means 102 reconstructs the transformed block by forming on the one hand a block of differences on the basis of the sequence of coefficients supplied by the statistical decoder 98 and on the other hand by summating this block of differences and the transformed block corresponding to the preceding frame and stored in a transformed frame memory 104.

The transformed block reconstructed either by the intraframe mode reconstruction means 100, or by the interframe mode reconstruction means 102, is stored in the transformed frame memory 104. Obviously this storage does not take place if the service code received by the switching unit 96 indicates that the block is fixed.

The transformed blocks supplied by the reconstruction means 100, 102 are applied to the input of a reverse quantification means 106 performing a reverse quantification to that performed by the quantification means 34 of the coder (FIG. 4) (when the quantification is performed in the coder by quantification means 36a, 36b, the reverse quantification is performed by a reverse quantification means 107, which immediately follows the statistical decoder 98. The transformed block supplied by said quantification means 106 is then processed by a reverse transformation means 108 in order to bring the transformed block from the frequency range to the spatial range. The transformation performed is the reverse of the direct cosine transformation performed by the coding system transformation means 32.

The blocks supplied by decoder 6 are transmitted to a post processing means in order to successively undergo time post filtering, oversampling and digital—analog conversion in order to restore the analog luminance and chrominance signals received by the preprocessing means on transmission.

TABLE I

| | | | | | | | | | | | | | | | →v |
|---|---|---|---|---|---|---|---|---|---|---|---|---|---|---|---|
| 9 | 7 | 7 | 6 | 6 | 6 | 6 | 6 | 5 | 5 | 5 | 5 | 4 | 4 | 4 | 3 |
| 7 | 7 | 6 | 6 | 6 | 6 | 5 | 5 | 5 | 5 | 4 | 4 | 4 | 3 | 3 | 3 |
| 7 | 6 | 6 | 6 | 5 | 5 | 5 | 4 | 4 | 4 | 3 | 3 | 3 | 2 | 2 | 2 |
| 6 | 6 | 5 | 5 | 5 | 4 | 4 | 4 | 3 | 3 | 3 | 2 | 2 | 2 | 1 | 1 |
| 6 | 5 | 5 | 5 | 4 | 4 | 4 | 3 | 2 | 2 | 1 | 1 | 0 | 0 | 0 | 0 |
| 6 | 5 | 4 | 3 | 3 | 3 | 2 | 2 | 1 | 1 | 0 | 0 | 0 | 0 | 0 | 0 |
| 5 | 4 | 3 | 3 | 2 | 2 | 1 | 1 | 0 | 0 | 0 | 0 | 0 | 0 | 0 | 0 |
| 5 | 4 | 3 | 3 | 2 | 2 | 1 | 0 | 0 | 0 | 0 | 0 | 0 | 0 | 0 | 0 |
| 5 | 4 | 3 | 2 | 1 | 1 | 0 | 0 | 0 | 0 | 0 | 0 | 0 | 0 | 0 | 0 |
| 4 | 3 | 2 | 1 | 1 | 0 | 0 | 0 | 0 | 0 | 0 | 0 | 0 | 0 | 0 | 0 |
| 4 | 3 | 2 | 1 | 1 | 0 | 0 | 0 | 0 | 0 | 0 | 0 | 0 | 0 | 0 | 0 |
| 4 | 3 | 2 | 1 | 0 | 0 | 0 | 0 | 0 | 0 | 0 | 0 | 0 | 0 | 0 | 0 |
| 4 | 2 | 1 | 0 | 0 | 0 | 0 | 0 | 0 | 0 | 0 | 0 | 0 | 0 | 0 | 0 |
| 3 | 2 | 1 | 0 | 0 | 0 | 0 | 0 | 0 | 0 | 0 | 0 | 0 | 0 | 0 | 0 |
| 3 | 1 | 0 | 0 | 0 | 0 | 0 | 0 | 0 | 0 | 0 | 0 | 0 | 0 | 0 | 0 |
| u ↓ 3 | 0 | 0 | 0 | 0 | 0 | 0 | 0 | 0 | 0 | 0 | 0 | 0 | 0 | 0 | 0 |

TABLE II

| | | | | | | | | | | | | | | | →v |
|---|---|---|---|---|---|---|---|---|---|---|---|---|---|---|---|
| 1 | 1 | 1 | 2 | 2 | 2 | 3 | 3 | 3 | 3 | 3 | 5 | 5 | 5 | 5 | 5 |
| 1 | 1 | 2 | 2 | 3 | 3 | 3 | 3 | 3 | 5 | 5 | 5 | 5 | 5 | 7 | 7 |
| 1 | 2 | 2 | 3 | 3 | 5 | 5 | 5 | 5 | 5 | 7 | 7 | 7 | 7 | 8 | 8 |
| 2 | 2 | 4 | 6 | 7 | 7 | 7 | 7 | 7 | 8 | 8 | 8 | 8 | 8 | 8 | 8 |
| 2 | 4 | 6 | 7 | 7 | 7 | 7 | 7 | 8 | 8 | 8 | 8 | 0 | 0 | 0 | 0 |
| 4 | 4 | 6 | 7 | 7 | 7 | 7 | 8 | 8 | 8 | 0 | 0 | 0 | 0 | 0 | 0 |
| 4 | 4 | 6 | 7 | 7 | 7 | 8 | 8 | 0 | 0 | 0 | 0 | 0 | 0 | 0 | 0 |
| 4 | 6 | 7 | 7 | 8 | 8 | 8 | 0 | 0 | 0 | 0 | 0 | 0 | 0 | 0 | 0 |
| 4 | 6 | 7 | 7 | 8 | 8 | 0 | 0 | 0 | 0 | 0 | 0 | 0 | 0 | 0 | 0 |
| 4 | 6 | 7 | 8 | 8 | 0 | 0 | 0 | 0 | 0 | 0 | 0 | 0 | 0 | 0 | 0 |
| 6 | 6 | 7 | 8 | 8 | 0 | 0 | 0 | 0 | 0 | 0 | 0 | 0 | 0 | 0 | 0 |
| 6 | 6 | 7 | 8 | 0 | 0 | 0 | 0 | 0 | 0 | 0 | 0 | 0 | 0 | 0 | 0 |
| 6 | 7 | 8 | 0 | 0 | 0 | 0 | 0 | 0 | 0 | 0 | 0 | 0 | 0 | 0 | 0 |
| 6 | 8 | 8 | 0 | 0 | 0 | 0 | 0 | 0 | 0 | 0 | 0 | 0 | 0 | 0 | 0 |
| 6 | 8 | 0 | 0 | 0 | 0 | 0 | 0 | 0 | 0 | 0 | 0 | 0 | 0 | 0 | 0 |
| u ↓ 8 | 0 | 0 | 0 | 0 | 0 | 0 | 0 | 0 | 0 | 0 | 0 | 0 | 0 | 0 | 0 |

TABLE III

| 1 | 2 | 3 | 4 | 5 | 6 | 7 | 8 | 10 | 12 | 14 | 16 | 18 | 20 | 22 | 25 |
|---|---|---|---|---|---|---|---|---|---|---|---|---|---|---|---|
| 9 | 11 | 13 | 15 | 17 | 19 | 21 | 23 | 26 | 28 | 30 | 32 | 34 | 36 | 38 | 41 |
| 24 | 27 | 29 | 31 | 33 | 35 | 37 | 39 | 42 | 44 | 46 | 48 | 50 | 52 | 54 | 57 |
| 40 | 43 | 45 | 47 | 49 | 51 | 53 | 55 | 58 | 60 | 62 | 64 | 66 | 68 | 70 | 73 |
| 56 | 59 | 61 | 63 | 65 | 67 | 69 | 71 | 74 | 76 | 78 | 80 | 82 | 84 | 86 | 89 |
| 72 | 75 | 77 | 79 | 81 | 83 | 85 | 87 | 90 | 92 | 94 | 96 | 98 | 100 | 102 | 105 |
| 88 | 91 | 93 | 95 | 97 | 99 | 101 | 103 | 106 | 108 | 110 | 112 | 114 | 116 | 118 | 121 |

TABLE III-continued

| 104 | 107 | 109 | 111 | 113 | 115 | 117 | 119 | 122 | 124 | 126 | 128 | 130 | 132 | 134 | 137 |
| --- | --- | --- | --- | --- | --- | --- | --- | --- | --- | --- | --- | --- | --- | --- | --- |
| 120 | 123 | 125 | 127 | 129 | 131 | 133 | 135 | 138 | 140 | 142 | 144 | 146 | 148 | 150 | 153 |
| 136 | 139 | 141 | 143 | 145 | 147 | 149 | 151 | 154 | 156 | 158 | 160 | 162 | 164 | 166 | 169 |
| 152 | 155 | 157 | 159 | 161 | 163 | 165 | 167 | 170 | 172 | 174 | 176 | 178 | 180 | 182 | 185 |
| 168 | 171 | 173 | 175 | 177 | 179 | 181 | 183 | 186 | 188 | 190 | 192 | 194 | 196 | 198 | 201 |
| 184 | 187 | 189 | 191 | 193 | 195 | 197 | 199 | 202 | 204 | 206 | 208 | 210 | 212 | 214 | 217 |
| 200 | 203 | 205 | 207 | 209 | 211 | 213 | 215 | 218 | 220 | 222 | 224 | 226 | 228 | 230 | 233 |
| 216 | 219 | 221 | 223 | 225 | 227 | 229 | 231 | 234 | 236 | 238 | 240 | 242 | 244 | 246 | 248 |
| 232 | 235 | 237 | 239 | 241 | 243 | 245 | 247 | 249 | 250 | 251 | 252 | 253 | 254 | 255 | 256 |

TABLE IV

| 1 | 2 | 4 | 7 | 11 | 16 | 22 | 29 | 37 | 46 | 56 | 67 | 79 | 92 | 106 | 121 |
| --- | --- | --- | --- | --- | --- | --- | --- | --- | --- | --- | --- | --- | --- | --- | --- |
| 3 | 5 | 8 | 12 | 17 | 23 | 30 | 38 | 47 | 57 | 68 | 80 | 93 | 107 | 122 | 137 |
| 6 | 9 | 13 | 18 | 24 | 31 | 39 | 48 | 58 | 69 | 81 | 94 | 108 | 123 | 138 | 152 |
| 10 | 14 | 19 | 25 | 32 | 40 | 49 | 59 | 70 | 82 | 95 | 109 | 124 | 139 | 153 | 166 |
| 15 | 20 | 26 | 33 | 41 | 50 | 60 | 71 | 83 | 96 | 110 | 125 | 140 | 154 | 167 | 179 |
| 21 | 27 | 34 | 42 | 51 | 61 | 72 | 84 | 97 | 111 | 126 | 141 | 155 | 168 | 180 | 191 |
| 28 | 35 | 43 | 52 | 62 | 73 | 85 | 98 | 112 | 127 | 142 | 156 | 169 | 181 | 192 | 202 |
| 36 | 44 | 53 | 63 | 74 | 86 | 99 | 113 | 128 | 143 | 157 | 170 | 182 | 193 | 203 | 212 |
| 45 | 54 | 64 | 75 | 87 | 100 | 114 | 129 | 144 | 158 | 171 | 183 | 194 | 204 | 213 | 221 |
| 55 | 65 | 76 | 88 | 101 | 115 | 130 | 145 | 159 | 172 | 184 | 195 | 205 | 214 | 222 | 229 |
| 66 | 77 | 89 | 102 | 116 | 131 | 146 | 160 | 173 | 185 | 196 | 206 | 215 | 223 | 230 | 236 |
| 78 | 90 | 103 | 117 | 132 | 147 | 161 | 174 | 186 | 197 | 207 | 216 | 224 | 231 | 237 | 242 |
| 91 | 104 | 118 | 133 | 148 | 162 | 175 | 187 | 198 | 208 | 217 | 225 | 232 | 238 | 243 | 247 |
| 105 | 119 | 134 | 149 | 163 | 176 | 188 | 199 | 209 | 218 | 226 | 233 | 239 | 244 | 248 | 251 |
| 120 | 135 | 150 | 164 | 177 | 189 | 200 | 210 | 219 | 227 | 234 | 240 | 245 | 249 | 252 | 254 |
| 136 | 151 | 165 | 178 | 190 | 201 | 211 | 220 | 228 | 235 | 241 | 246 | 250 | 253 | 255 | 256 |

TABLE V

| buffer store filling level (in %) | N.max | R.max | $E_S$ (%) | TA |
| --- | --- | --- | --- | --- |
| 7.5 | 128 | 400 | 100 | 0 |
| 15 | 128 | 300 | 99.8 | 1 |
| 22.5 | 112 | 250 | 99.7 | 2 |
| 27.5 | 100 | 225 | 99.6 | 3 |
| 37.5 | 90 | 200 | 99.5 | 4 |
| 50 | 90 | 190 | 99.4 | 5 |
| 62.5 | 80 | 160 | 99.2 | 6 |
| 75 | 70 | 140 | 99 | 7 |
| 87.5 | 50 | 120 | 98.5 | 8 |
| 100 | 40 | 100 | 97 | 10 |

TABLE VI

| SERVICE CODES | | STATISTICAL CODE | | |
| --- | --- | --- | --- | --- |
| MODE | CLASS | NSUP | CONTINUOUS COMPONENT | ALTERNATING COMPONENTS |
| MODE | 00 | A PRIORI FIXED BLOCK | | |
| | 01 | A POSTERIORI BLOCK | | |
| | 11 | INTRAFRAME MODE CODING | | |
| | 10 | INTERFRAME MODE CODING | | |
| CLASS | XXXX | CLASS NUMBER | | |
| NSUP | YYYY | NUMBER OF SEQUENCE COEFFICIENTS TRANSMITTED (4 TO 7 BITS) | | |
| CONTINUOUS COMPONENT | ZZZZZ | CONTINUOUS COMPONENT CODE (5 BITS IN INTERFRAME MODE, 9 BITS IN INTRAFRAME MODE) | | |
| ALTERNATING COMPONENTS | | CODE OF ALTERNATING COMPONENTS | | |

I claim:

1. Process for hybrid coding by transformation for reducing the data volume necessary for representing pictures, in which the pictures are defined by a sequence of frames, each frame containing a set of matrix-organized blocks, each block containing a set of matrix-organized digital data representing part of the picture, characterized in that the process involves transforming each digital data block into a block transformed coefficients representing said block in the frequency range, quantifying the transformed coefficients of each block to obtain quantified transformed coefficients, each having a value taken from a limited set of predetermined values, scanning each block of quantified transformed coefficients to produce a sequence of quantified transformed coefficients and evaluating the data volume necessary for coding said sequence by statistical coding, calculating a block of difference coefficients by a difference between a block of quantified transformed coefficients and the corresponding block of the preceding frame, scanning the block of difference coefficients for producing a sequence of difference coefficients and evaluating the data volume necessary for coding said sequence of difference coefficients by said statistical coding, comparing of the data volumes necessary for coding a block and deciding on the coding mode as a function of said data volumes and the maximum volume authorised by the rate on the transmission lines and statistical coding of the block, in accordance with the decided mode, by said statistical code.

2. Process according to claim 1, characterized in that it comprises a supplementary movement detection stage performed after the transformation stage, said movement detection stage consisting of comparing a transformed block of the current frame with the corresponding transformed block of the preceding frame to obtain a difference and, in the case where said difference is below a predetermined threshold, transmitting on the transmission line a non-refreshing code for the block.

3. Process according to claim 1, characterized in that it comprises a supplementary movement detection stage, performed after the quantification stage, said movement detection stage consisting of comparing the transformed block of the current frame with the corresponding transformed block of the preceding frame and, in the case where said difference is below a predetermined threshold, transmitting on the transmission line a non-refreshing code for the block.

4. Process according to claim 1, characterized in that, for each scanning stage, several classes of blocks each corresponding to a given block frequency structure is defined, for each class is defined a scan adapted to said class and during each scanning stage, the best class for a block is determined by an energy criterion of the block and said block is scanned in accordance with the scan associated with said best class.

5. Process according to claim 4, characterized in that a definition takes place of a partition of the components of the block into several zones and in that each class is either a zone, or a combination of several zones.

* * * * *